United States Patent [19]

Moolenaar

[11] Patent Number: 4,979,229
[45] Date of Patent: Dec. 18, 1990

[54] METHOD OF AND APPARATUS FOR CONVERTING THE RESOLUTION OF AN IMAGE REPRESENTED BY A PATTERN OF BIVALENT PIXELS

[75] Inventor: Abraham Moolenaar, Venlo, Netherlands

[73] Assignee: Oce-Nederland B.V., Venlo, Netherlands

[21] Appl. No.: 475,193

[22] Filed: Feb. 5, 1990

[30] Foreign Application Priority Data

Feb. 6, 1989 [NL] Netherlands .......................... 8900284

[51] Int. Cl.$^5$ .............................................. G06K 9/00
[52] U.S. Cl. .......................................... 382/56; 382/47
[58] Field of Search ............................. 382/47, 56, 54; 358/432, 433, 470

[56] References Cited

U.S. PATENT DOCUMENTS 4,569,081  2/1986  Mintzer et al. ........................ 382/47
4,712,140 12/1987  Mintzer et al. ........................ 382/47

Primary Examiner—Leo H. Boudreau
Attorney, Agent, or Firm—Reed Smith Shaw & McClay

[57] ABSTRACT

The original image reproduced on a pixel raster is taken apart into a number of adjoining pixel structures and these are each replaced by a resolution-independent replacement surface, in accordance with rules described in the application. The replacement surfaces together form a resolution-independent intermediate image which is mapped on a new pixel raster with the required different resolution.

6 Claims, 7 Drawing Sheets

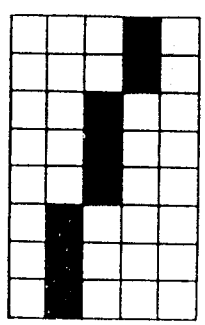
FIG. 1
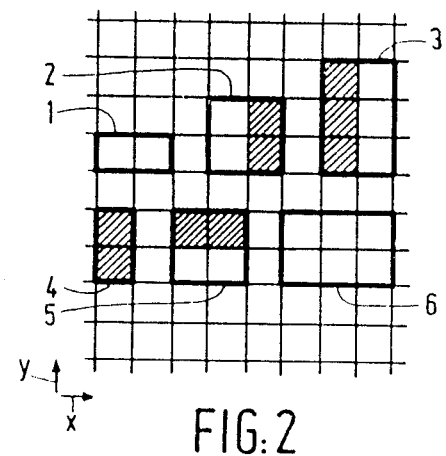
FIG. 2
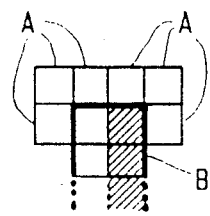
FIG. 5
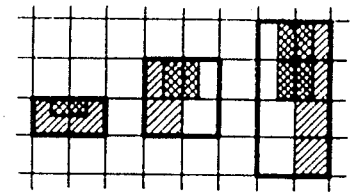
FIG. 3
FIG. 4b
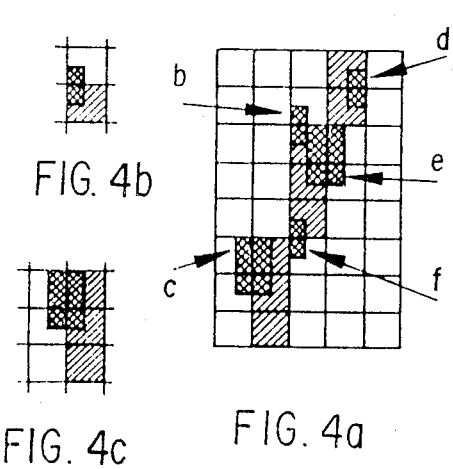
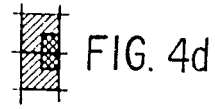
FIG. 4d
FIG. 4e
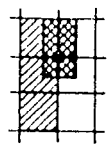
FIG. 4c   FIG. 4a
FIG. 4f

METHOD OF AND APPARATUS FOR CONVERTING THE RESOLUTION OF AN IMAGE REPRESENTED BY A PATTERN OF BIVALENT PIXELS

FIELD OF THE INVENTION

The invention relates to a method and apparatus for converting the resolution of an image represented by a matrix of bivalent pixels comprising a pattern in which, on the basis of the values of pixels of the pattern, replacement surfaces having a different resolution are generated and are put in the place of the pattern, and to an apparatus for the same.

BACKGROUND OF THE INVENTION

Generally, when pixels are placed in a rectangular raster, image boundaries extending obliquely, i.e., not in a major direction of the raster, are reproduced as a series of steps. This effect, known as "staircasing", has a negative influence on image quality and may rapidly lead to unacceptable results in the event of indiscriminate enlargement of the pixel image, e.g., by doubling the number of pixels in both major directions. Prior to any enlargement or, generally, to any change of resolution of a pixel image, it is recommended that the original non-rastered image be reconstructed, as far as possible, by converting the pixel image into a non-rastered form or at least into a raster pattern having a very high resolution with respect to the resolution of the original pixel pattern. By such reconstruction the staircasing disappears. The reconstructed image is then mapped on a raster with the required resolution.

One such method is described in U.S. Pat. No. 4,242,678 where the value of the pixels is determined for each pixel in a pixel window, a 3×3 pixel window, with the required pixel as the centerpoint. This combination of pixel values is searched in a previously made table containing a replacement surface for each possible combination. This replacement surface, which has a form rastered with very high resolution, is put in the place of the required pixel and converted into a pattern of new pixels having the required different resolution. By performing this replacement for all the original pixels, a new pixel pattern is constructed with the required resolution.

A disadvantage of the known method is that it is limited to small analysis are as (3×3 pixels) and even smaller processing zones (1 pixel) so that larger structures cannot be adequately treated. As a result, oblique image boundaries, for example, extending at an angle other than 45°, are still reproduced with some degree of staircasing in replacement surfaces. Enlargement of the analysis window admittedly provides an improvement but results in a gigantic enlargement of the comparison table and hence processing time.

Accordingly, it is an object of the present invention to provide a method and an apparatus for generating correct replacement surfaces for image boundaries extending at any angle.

SUMMARY OF THE INVENTION

Generally, the present invention provides a method in which sub-patterns are searched in the pixel pattern. These sub-patterns are formed by two straight rows of pixels disposed side by side, including rows with a length of one pixel. Said pixels have the .same value per row. The length in pixels of such sub-patterns is determined and at least one basic form is selected for each end of such sub-patterns on the basis of the values of the pixels situated in and directly adjoining the sub-pattern. A replacement surface is generated from the basic form by making its length equal to half the length of the sub-pattern, and the replacement surface is put in the place of the pixels between the relevant end and the middle of the sub-pattern.

The replacement surfaces are, therefore, not limited in size to the format of one original pixel but are adapted to the dimensions of the pixel structures which they are to replace. As a result, replacement surfaces having one side at any angle can be formed from basic forms having an oblique side by adjusting the length-width ratio. The method according to the invention also has the advantage that images containing many lines or image boundaries extending in parallel or substantially parallel to the major directions of the pixel raster can be described by a small number of replacement surfaces, thus resulting in data reduction.

Important sub-patterns are those which are formed by rows of more than one pixel length which differ from one another in pixel value. These form the boundaries of image parts and lines. In such sub-patterns the basic form is selected on the basis of the values of the pixels situated in and directly adjoining the relevant end of the sub-pattern. It is therefore unnecessary to analyze all the pixels situated in and around the entire sub-pattern.

Where two image boundaries or lines cross, one extending in a major direction of the pixel raster and the other forming an acute angle therewith, the method according to the invention yields a replacement surface having an oblique side for the first image boundary, since this is interpreted as an oblique image boundary. The resulting error is only half a pixel large and is, therefore, visible only in the case of very thin lines (1 pixel wide lines). However, this error can simply be corrected by replacing, where two sub-patterns differing only in length adjoin one another and are oriented in one and the same first direction and are offset one pixel in a second direction perpendicular to the first direction, the replacement surface of the adjoining end of the longest sub-pattern by a new replacement surface made up of two partial surfaces, i.e., a first partial surface in accordance with the basic form of the longest subpattern and having a length equal to half the length of the shorter sub-pattern, and a second partial surface having a length equal to half the difference in length of the two sub-patterns.

Further features and advantages of the method and apparatus according to the invention will be clear from the following description with reference to the accompanying drawings.

BRIEF DESCRIPTION OF THE DRAWINGS

FIG. 1 is a part of a pixel pattern.

FIG. 2 shows a square raster with a number of sub-patterns therein.

FIG. 3 shows a square raster with a number of sub-patterns provided with a location rectangle therein.

FIG. 4 is the pixel pattern of FIG. 1 provided with a number of location rectangles.

FIG. 5 shows one end of a sub-pattern with surrounding pixels.

PRESENTLY PREFERRED EMBODIMENTS

Figure 6:
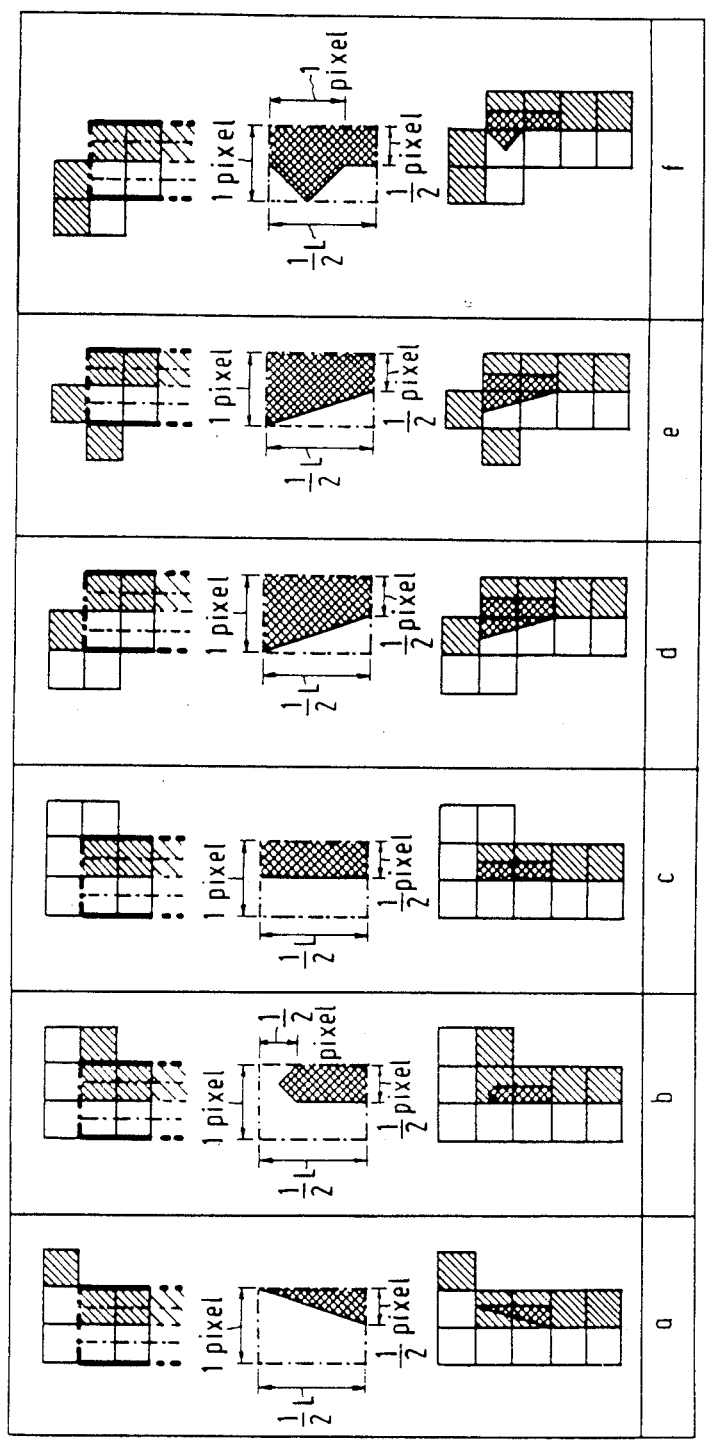
FIG. 6 is a set of pixel combinations with associated basic forms and replacement surfaces.

FIG. 1 shows a part of an image represented by bivalent (e.g., black and pixels arranged in a square raster. The image forming the basis of the pixel image is an oblique line having the width of one pixel. Owing to the orthogonal character of the raster representation, however, the pixel image has the form of number of vertical bars. This is a form of the "staircasing." When an image of this kind has to be enlarged, i.e., imaged on a larger number of pixels, it must first be converted into a non-rastered intermediate image, because otherwise the staircasing will be enlarged. The intermediate image is then mapped on a raster pattern having the required new resolution.

The non-rastered intermediate image is built up of elements, herein referred to as "replacement surfaces" which are always put in place of a number of pixels of the pixel image. In principle, for this purpose, a number of small rectangular zones into which the replacement surface can be placed are reserved for each pixel combination, consisting of two adjacent straight rows of pixels in which the pixels have the same value per row. A pixel combination of this kind will hereinafter be referred to as a "sub-pattern" and a zone for the replacement surface will be referred to as a "location rectangle". It should be noted that a row of one element also comes within the definition of a sub-pattern.

FIG. 2 shows a number of possible sub-patterns reproduced on a square raster. The sub-patterns 1, 2 and 3 are directed in the y-direction and the sub-patterns 4, 5 and 6 in the x-direction. Sub-patterns can consist of two white rows, a white and a black row, and two black rows. In principle, all the sub-patterns are taken into consideration, including sub-patterns which are part of a larger sub-pattern. Thus a sub-pattern having a length of two pixels contains two sub-patterns situated in the same direction and having a length of one pixel, and also a row of pixels together with each of its two neighboring rows may form a sub-pattern.

Subject to the rules indicated hereinafter, there are defined for a sub-pattern two location rectangles for placing a replacement surface therein. A location rectangle has a length and a width equal to half of that of the sub-pattern and is situated over one end thereof, on the parting line between two pixel rows. Both ends of a sub-pattern are this provided with a location rectangle. The following rules are applied:

1. No location rectangles are placed in sub-patterns consisting entirely of white pixels.
2. If a white pixel row and a black pixel row are situated side by side, location rectangles are placed only in the longest sub-pattern formed as a result, and hence not in the shorter sub-patterns having the same direction and enclosed in the longest sub-pattern.
3. Each two adjacent black pixels are provided with location rectangles; no location rectangles are placed in longer sub-patterns consisting entirely of black pixels.

Where no location rectangle is placed, also no replacement surface is placed.

FIG. 3 shows a number of examples of sub-patterns in which one of the two location rectangles is shown in each case. Black pixels here are shown by single hatching and the location rectangles by double hatching.

In FIG. 4, as an example, a number of location rectangles are indicated for the pixel pattern in FIG. 1, always with the sub-pattern for which they are defined. The location rectangles shown form only part of the total of 26 location rectangles to be placed in this pixel pattern (excluding the sub-patterns extending over the periphery).

A replacement surface is placed in each of the location rectangles obtained in the above-described manner. This replacement surface is in turn derived from a basic form and from the length of the sub-pattern.

The basic form is selected on the basis of the values of the pixels in the sub-pattern and the directly adjoining pixels from a previously made set. This set is so made up that the replacement surfaces of a pixel pattern cannot in any case overlap one another. This is in contrast to the location rectangles, which can overlap.

For sub-patterns having a length of more than one pixel, a basic form is selected by a procedure which differs somewhat from that followed for sub-patterns having a length of one pixel. The two cases will be discussed separately here.

In accordance with rule 2 hereinbefore, sub-patterns having a length of more than one pixel are only provided with replacement surfaces if they consist of a white pixel row and a black pixel row. For such sub-patterns, the pixels directly adjacent the end of the subpattern, together with the sub-pattern combination itself, appear to give sufficient information for the choice of a basic form. In FIG. 5, the pixels of importance for the choice are indicated by the letter A and the sub-pattern itself by the letter B.

A set of basic forms with the associated pixel values is shown in compressed form in FIG. 6. In this Figure, the sub-pattern, only one end of which is shown, is surrounded by a thick line in each top diagram. The sub-pattern is considered to have a length of L pixels ($L \geq 2$). Only the pixels relevant to the choice of a basic form are shown, the black pixels being represented by single hatching.

In each sub-pattern the location rectangle is indicated by a dot-dash line, it being noted that the location rectangle always has a length $\frac{1}{2}L$, i.e., half the length of the sub-pattern, which may be shorter than the form shown in FIG. 6. In each case the location rectangle adjoins the top boundary of the sub-pattern.

In each middle diagram of FIG. 6, the basic form to be selected with the given pixel value combination is shown in relation to the location rectangle, which is again denoted by a dot-dash line. The general shape of the basic form is converted to a specific replacement surface by filling in the value of $\frac{1}{2}L$. As an example, each bottom diagram of FIG. 6 shows a replacement surface in a sub-pattern having a length of four pixels. Both the basic forms and the replacement surfaces are shown in double hatching.

The set shown in FIG. 6 describes all the pixel combinations leading to the placing of a replacement form, since the pixel combinations arising out of those illustrated by reflection in the x-axis, the y-axis and in both axes and the forms thereof rotated through 90° are included in the set. This leads to 48 different situations for the selection of a basic form. In such cases one and the same pixel combination may belong to different situations. For example, a vertical sub-pattern (as shown) as well as a horizontal sub-pattern (situation after reflection about the two axes) belong to the combination in FIG. 6, column f.

Figure 7:
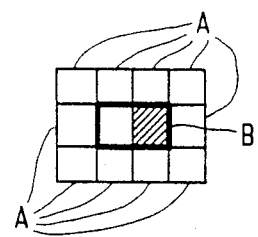
FIG. 7 is a sub-pattern with surrounding

Sub-patterns having a length of one pixel are provided with location rectangles if they do not consist of two white pixels as follows from rule 1 above. In such sub-patterns, in principle all the pixels adjacent the sub-pattern are considered for the choice of a basic form. This is shown in FIG. 7 in the same way as in FIG. 5. Since the length of these sub-patterns is always one pixel, the basic form can be used directly as the replacement surface.

Figure 8:
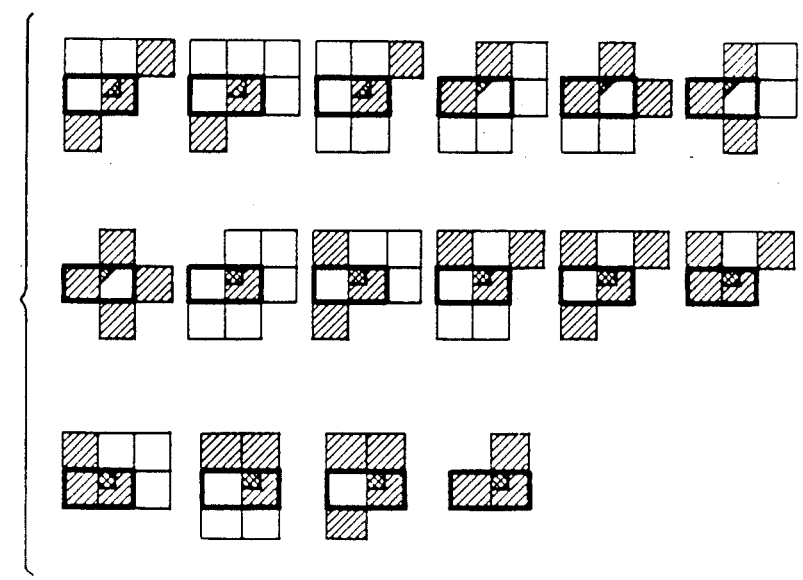
FIG. 8 is a set of pixel combinations with associated basic forms.

FIG. 8 is a set of basic forms/replacement surfaces with the associated pixel combinations shown in compressed form. Here the subpattern is always surrounded by a thick line. Black pixels are indicated by single hatching. Pixels whose value is not relevant to the choice of a replacement surface are omitted. The replacement surfaces are drawn directly in the diagrams and are indicated by double hatching. From the 16 diagrams shown it is possible to derive all 64 pixel combinations leading to placing of a replacement surface by reflection in the x-axis, the y-axis and in both axes. Here too a pixel combination may occur several times in the set, always associated with a different situation.

From the top diagrams of FIG. 5 and the diagrams of FIG. 8 it will be apparent that the pixels relevant to the choice of a basic form are always located within a matrix of 3×3 pixels. In the diagrams of FIG. 5 this matrix is formed by the top three rows of pixels. For the analysis of a pixel pattern, therefore, all the necessary information can be obtained by sampling the pattern with an analysis window of 3×3 pixels and comparing the pixel combination therein with the two sets described.

Figure 9:
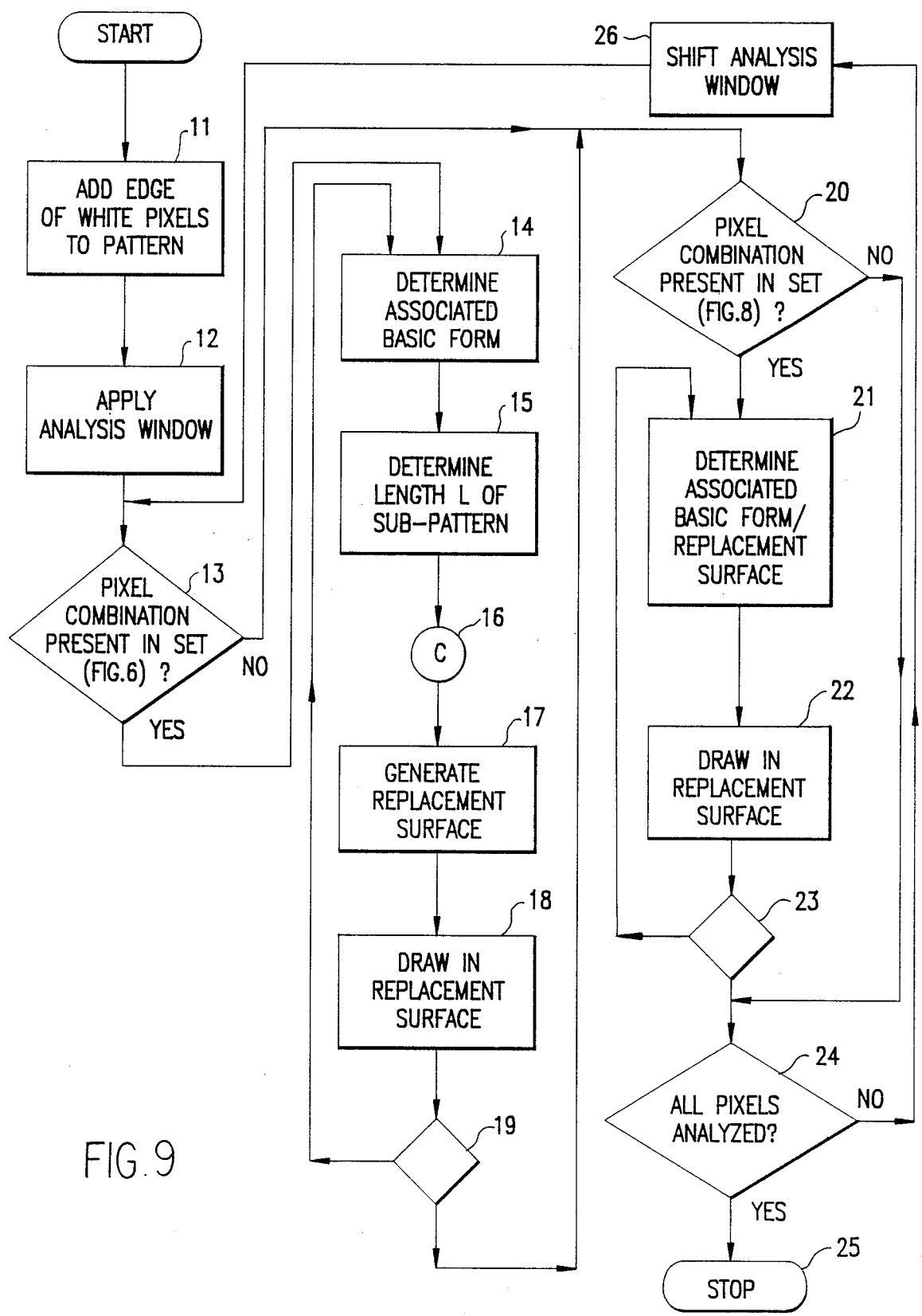
FIG. 9 is a flow diagram of a method according to the invention.

FIG. 9 is a flow diagram of a method according to the invention followed in changing the resolution of an image represented by a pixel pattern. It is assumed that the image information is available in the form of pixel values (0 or 1) in a memory (RAM).

In order to avoid continually having to check whether a pixel forms part of the edge of the image, an edge of white pixels is first placed around the pattern (step 11 in FIG. 9). These pixels themselves add no image information but simply facilitate processing.

Then (step 12) an analysis window of 3×3 pixels is applied to the pixel pattern at a logical location, e.g., in the top left-hand corner of the image. In step 13 the pixel combination in the window is compared with the 48 combinations shown (in compressed form) in FIG. 6. If the combination in the window is found amongst them, which shows that the combination forms part of one or more sub-patterns consisting of two pixels rows of unequal pixel value, the associated basic forms are determined (step 14) and a routine is started for measuring the length of the associated sub-patterns (step 15). This routine counts the pixels of both rows in a direction associated with the pixel combination until a pixel is found whose value differs from the row in which it is situated and then returns the thus found length of the sub-pattern. Via a correction step 16 which will be discussed hereinafter, the data collected in steps 14 and 15 are converted in step 17 to replacement surfaces characterized by a form code, length, orientation and position with respect to the original raster. In step 18 the replacement surfaces thus obtained are "drawn in", i.e., converted to pixels of the new raster and stored in a memory. Step 19 forms a switch which, in the case of pixel combinations associated with more than one sub-pattern, refers back to step 14 for processing the next sub-pattern or—if all the sub-patterns have been processed—refers through to the next program step.

A check is then made (in step 20) whether the pixel combination in the analysis window occurs in the set of 64 combinations shown (in compressed form) in FIG. 8; in other words, whether the middle pixel of the analysis window forms part of one or more sub-patterns of two pixels. Step 20 can also be reached from step 13 if the pixel combination in the analysis window does not occur in the set mentioned there.

If the outcome of step 20 is affirmative, the replacement surfaces associated with this pixel combination (which in this case are equal to the basic form) are determined (step 21) and "drawn in" (step 22), step 23 again forming a switch similar to step 19. If the outcome of step 20 is negative, steps 21 and 22 are skipped. Finally, after a check in step 24 whether all the pixels have already been analyzed, the analysis window is shifted one pixel (step 26) and the analysis repeated or the replacement operation terminated (25).

Since the length of each sub-pattern is measured twice in accordance with the above procedure (i.e., from each end), the method can be accelerated by storing the length of a sub-pattern after the first measurement in a memory and reading the same out when the other end of the sub-pattern is found. Of course this takes up some memory space but provides a gain in speed.

Figure 10:
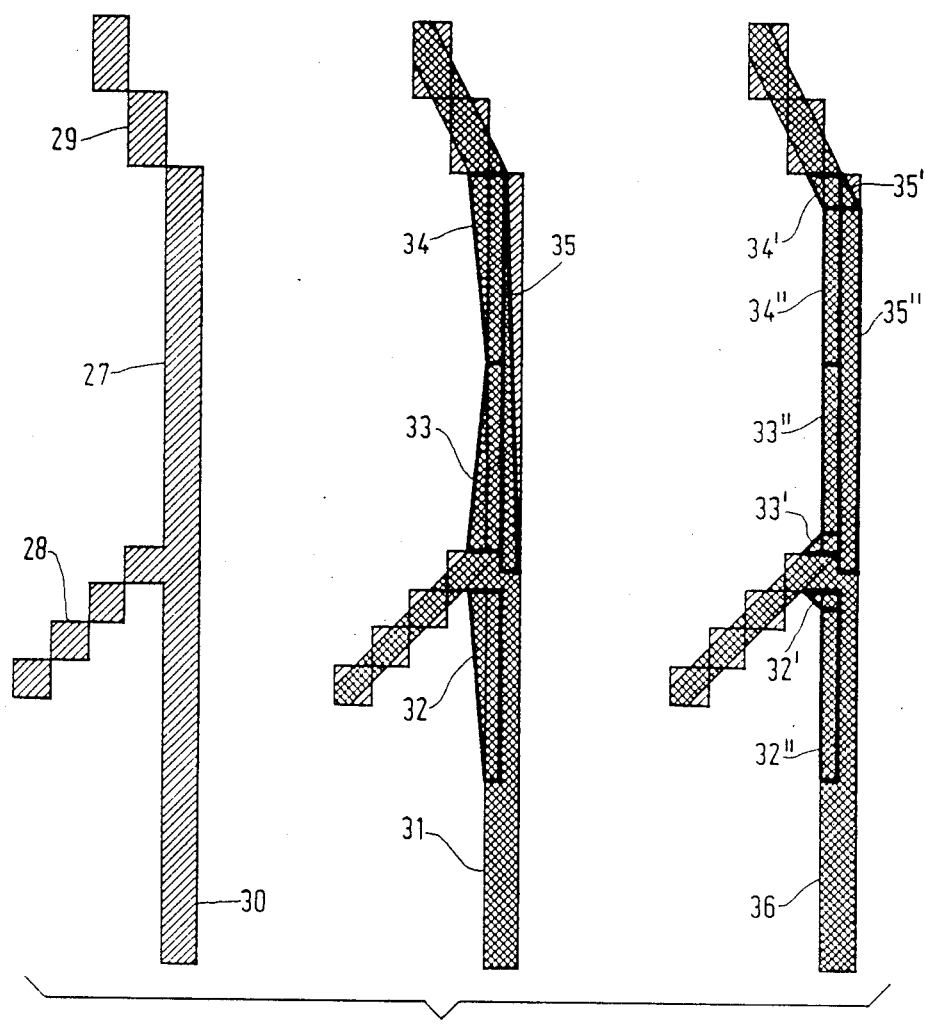
FIG. 10 shows a pixel pattern with intermediate images generated in different ways.

The above-described method usually gives good results but in certain cases oblique replacement surfaces are generated where straight ones would have been a better choice. This results in line thickness variations which are conspicuous when the original image contains very thin lines parallel to a main direction of the pixel raster. FIG. 10 shows some examples of this, 30 being the rastered representation of a structure of a vertical line (27) and two oblique lines (28, 29) with a thickness of one pixel and 31 (double hatched) the intermediate image built up from replacement surfaces according to the method described above.

The minor deviations introduced by the method are visible here as line thickness and direction variations because very thin lines are involved. They are caused by the replacement surfaces 32, 33, 34 and 35 which form a gradual transition from the vertical to the oblique line sections, while that is not intended here.

A simple correction is possible for these deviations. Deviations occur only in the case of the basic forms in accordance to FIG. 6 column a, d or e. It has been found in cases a and d that a better result is obtained by constructing a two-part replacement surface from a part 33', 34', 35' generated in the normal manner from the basic form but having a length equal to half of the much shorter sub-patterns of the oblique line portions, and a rectangular filter part 33'', 34'', 35''.

Figure 11:
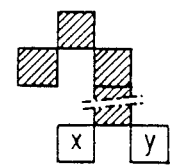
FIG. 11 shows a pixel combination.

In the case of a basic form in accordance to FIG. 6, column e, the values of the pixels in the surroundings of the other end of the associated sub-pattern, particularly the pixels indicated by x and y in FIG. 11, are determining factors for the correction. Only when it is apparent from examination of these pixels that the associated subpattern forms part of an oblique structure (that is the case if x = white and also y black) the standard method is applied; in all other cases the replacement surface is built up from a part 32' in accordance with the basic form and with a length of half a pixel and a rectangular filler part 32".

According to the correction method thus described an intermediate image is obtained as shown at 36 in FIG. 10, which corresponds more satisfactorily to the original pixel image.

Figure 12:
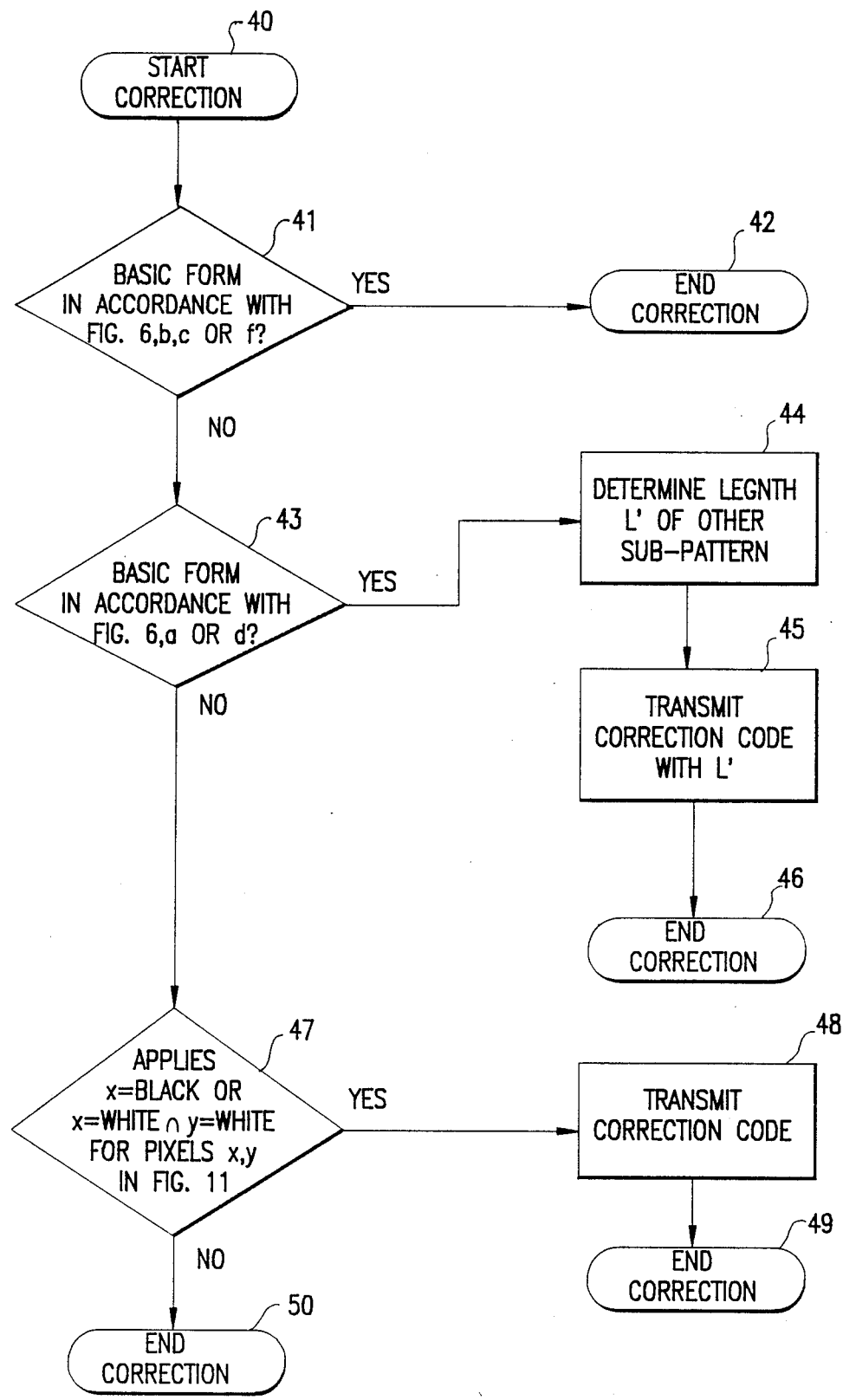
FIG. 12 is a flow diagram of a correction procedure in the method according to the invention.

The correction procedure is denoted in FIG. 9 by reference 16 and is worked out in FIG. 12. After the data has been collected in the normal method to generate a replacement surface, the correction procedure (40) starts. In this a check is first made in step 41 whether correction is necessary by checking what basic form has been selected.

In the case of a basic form in accordance with FIG. 6, column b, c or f, no correction is necessary and the produce (42) terminates with return to the main procedure in FIG. 9. If a basic form according to FIG. 6, column a or d is selected (step 43), then in step 44 the length L' of the adjacent sub-pattern is measured and, if L' is smaller than L, a warning is given that the replacement surface must be composed of a part haVing the length ½L' and a filler part (step 45), whereafter the procedure is terminated (46). In the remaining case, i.e., if a basic form in accordance with FIG. 6, column e, has been selected, a test follows in step 47 on the values of the pixels x and y (in FIG. 11) at the other end of the sub-pattern. If x and y are both white or if x is black a warning is given in step 48 that the replacement surface must be a two-part one with a part in accordance with the basic form having a length of half a pixel and a filler part, whereafter the procedure terminates (49). In the other case the procedure terminates without any action (50) and the replacement surface is generated by the standard method.

Figure 13:
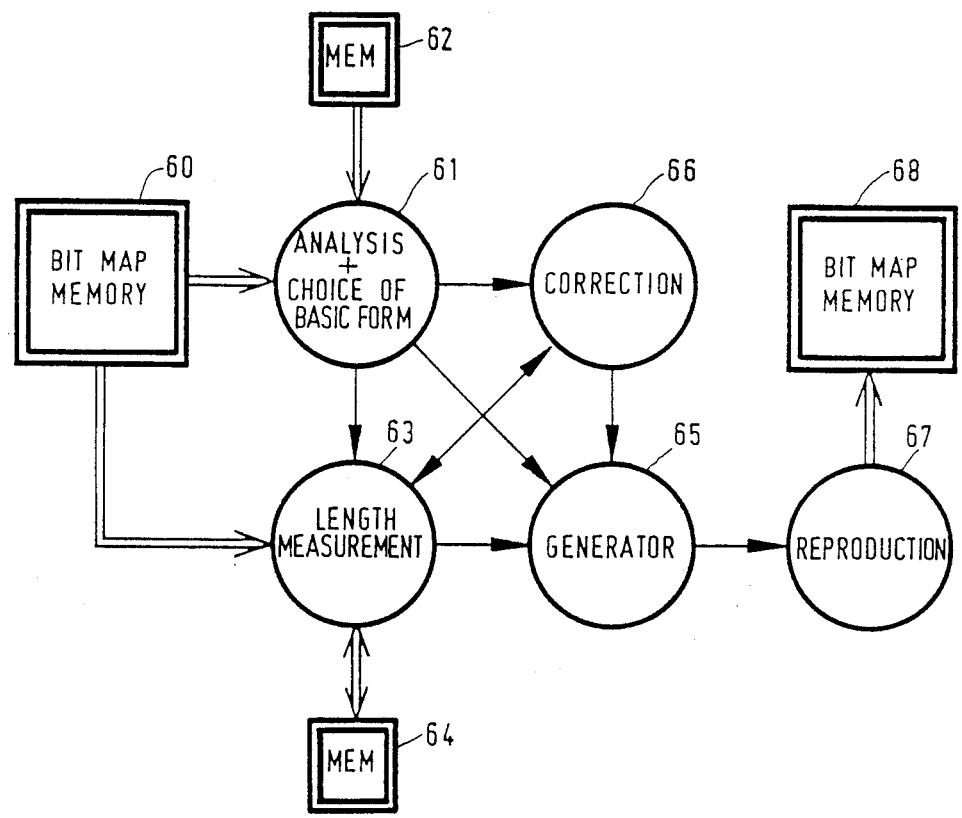
FIG. 13 is a diagrammatic representation of an apparatus to the invention.

An apparatus for using the method described is shown in FIG. 13 in the form of a block schematic. A memory (RAM) 60 is connected to an analysis module 61 in turn connected to a memory 62. Memory 60 is also connected to a measuring module 63 in turn connected to a memory 64. Analysis module 61 and measuring module 63 are interconnected and are both connected to a generation module 65 and a correction module 66 which are also interconnected. The generation module 65 is connected to a reproduction module 67 in turn connected to a memory (RAM) 68. The modules represented by means of circles are programs running in a computer but they could also be embodied as hardware.

The original image information can be stored in the form of pixel values (a bit map) in memory 60. The analysis module 61 accesses this memory and compares portions of 9 pixels disposed in a 3×3 matrix with the sets of pixel combinations shown in FIGS. 6 and 8. These sets are stored in the memory 62. If the pixel combination in the 3×3 matrix is found in the set shown in FIG. 6, which indicates that a sub-pattern has been hit upon, the analysis module transmits the basic form associated with that combination and also stored in memory 62 to generation module 65 and correction module 66 and instructs measuring module 63 to measure the length of the signal led sub-pattern. The measuring module has free access to the memory 60 for determining the pixel values therein and counts the number of pixels equal to the sub-pattern length. The result of the count is transmitted by the measuring module to the generation module 65 and also stored in memory 64 for use when the other end of the sub-pattern has been signalled.

On receipt of the basic form, the correction module 66 checks whether it has to come into operation and, if so, what correction it is required to perform. The criteria for this have already been described with reference to FIG. 12. If necessary, the correction module instructs the measuring module 63 to measure the length of an adjacent sub-pattern or to determine the value of the pixels at the other end of the associated sub-pattern. The measuring module 63 returns the requested data to the correction module 66.

After receipt of the basic form, sub-pattern length and any correction data, the generation module 65 generates a replacement surface and transmits it to the reproduction module 67 which maps the replacement surface on a raster pattern of the required resolution and stores it in the memory 68, either for direct printout on a printer (not shown) or for storage for later use.

In the manner described above the entire original pixel pattern in memory 60 is converted by the apparatus into a new pixel pattern having a different resolution and stored in memory 68.

Although the invention has been explained by reference to the above description and the associated drawings, the invention is not limited thereto. It will be apparent to the skilled addressee that other implementations are possible within the scope of the claims.

What is claimed is:

1. Method for converting the resolution of an image represented by a pattern of bivalent pixels comprising:
   A. searching said pixel pattern for sub-patterns, each of said sub-patterns being formed by two straight rows of pixels, said rows being disposed side-by-side and including rows with a length of one pixel, the pixels forming the rows having the same value per row, and determining the length (in pixels) of sub-patterns located;
   B. selecting at least one basic form for each end of sub-patterns located in Step A, said selection for each of said ends being based upon the value of the pixels located in and directly adjoining the sub-pattern;
   C. generating a replacement surface for each end of said sub-pattern by making the length of the selected basic form equal to half the length of said sub-pattern;
   D. replacing the pixels located between the middle of the sub-pattern and the end for which such form was selected with the replacement surface generated in step C; and
   E. reproducing the said replacement surfaces in the form of a new pattern of pixels having a resolution different from that of the original image.

2. A method according to claim 1, wherein in the case of sub-patterns formed by rows differing from one another in respect of pixel value and having a length of more than one pixel, said basic form is selected on the basis of the values of the pixels located in and directly adjoining the associated end of said sub-pattern.

3. A method according to claim 1 or 2, wherein, where two sub-patterns differing only in length adjoin one another and are oriented in one and the same first direction and are offset one pixel in a second direction perpendicular to said first direction, said replacement surface of the adjoining end of the longest sub-pattern is replaced by a new replacement surface comprising first and second partial surfaces, said first partial surface being generated from the selected basic form of the longest sub-pattern and having a length equal to half the length of the shorter sub-pattern, said second partial surface having a length equal to half the difference in length of the two sub-patterns.

4. Apparatus for converting the resolution of an image represented by a pattern of bivalent pixels comprising:

A. storage means for storing at least one basic form;

B. replacement means for determining, on the basis of analysis of the values of the pixels of the pattern, replacement surfaces to be put in the place of said pixels, including B1. recognition means for searching said pixel pattern for sub-patterns, each of said sub-patterns being formed by two straight rows of pixels, said rows being disposed side-by-side and including rows with a length of one pixel, the pixels forming the rows having the same value per row, and for selecting at least one basic form from storage for each end of sub-patterns located, based upon the values of the pixels in said pattern;

B2. measuring means for determining the length (in pixels) of sub-patterns located;

B3. adaptation means for generating a replacement surface based upon said selected basic form and having a length equal to half the length of the associated sub-pattern; and C. reproduction means for reproducing said replacement surfaces in the form of a new pattern of pixels having a resolution different from that of the original image.

5. Apparatus as set forth in claim 4, wherein said basic form is selected by said recognition means on the basis of the value of the pixels in and directly adjoining the associated sub-pattern.

6. Apparatus according to claim 4 or 5, wherein said replacement means includes a correction means for checking whether a first sub-pattern adjoins a second sub-pattern differing from said first sub-pattern only in length and oriented in the same direction as said first sub-pattern but offset with respect to said first sub-pattern by one pixel in a second direction substantially perpendicular to said first direction, and, in the affirmative, instructing said adaptation means to generate for the adjoining end of the longest sub-pattern a replacement surface made up of first and second partial surfaces, said first partial surface being generated in accordance with the basic form of the longest sub-pattern and having a length equal to half the length of the shorter sub-pattern, and said second partial surface having a length equal to half the difference in length of the two sub-patterns.

* * * * *